June 28, 1938.  F. ALTMAYER  2,122,272
BATTERY DUMPER
Filed March 16, 1935  4 Sheets-Sheet 1
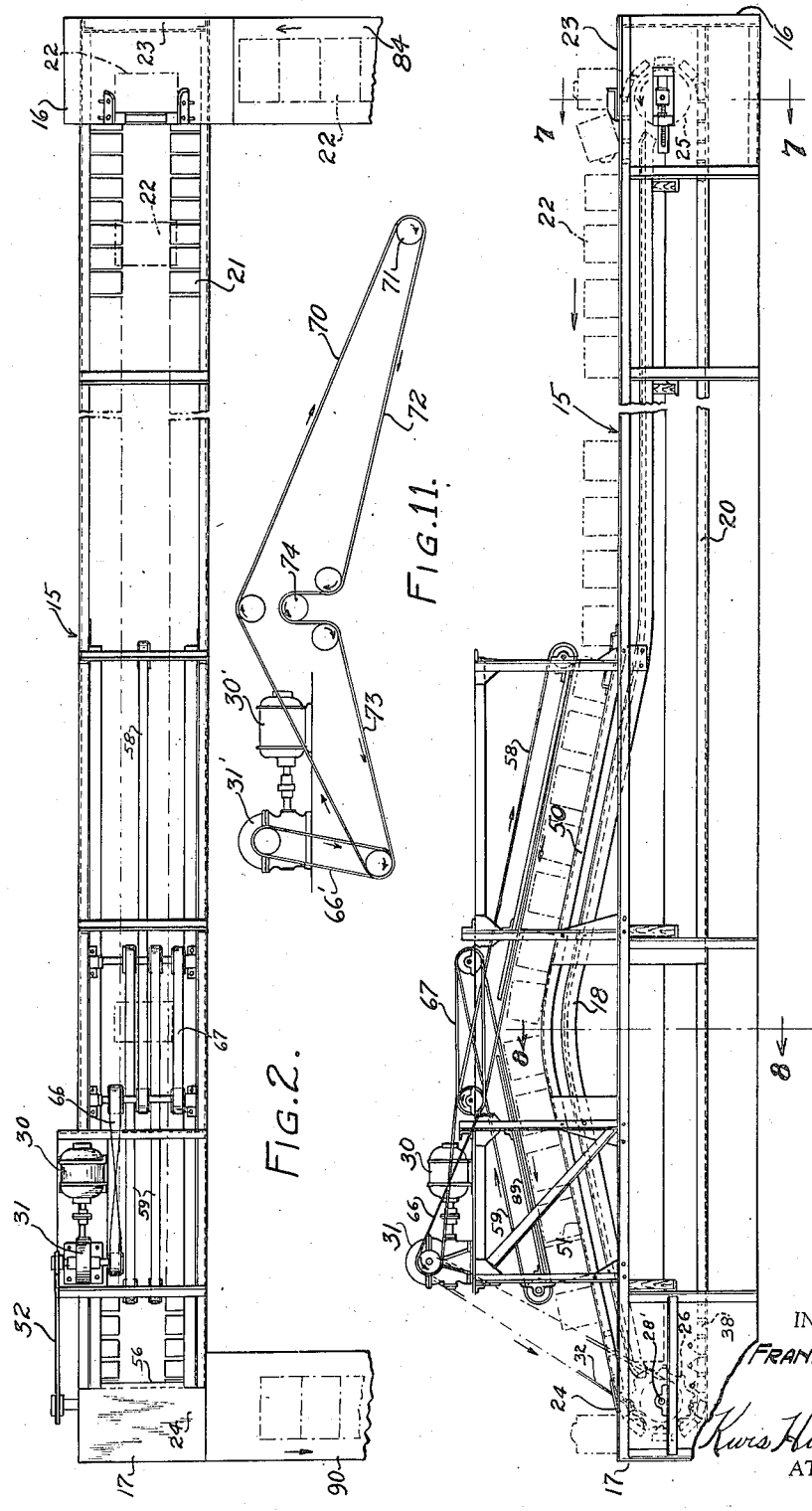
INVENTOR.
FRANK ALTMAYER
Kwis Hudson & Kent
ATTORNEYS

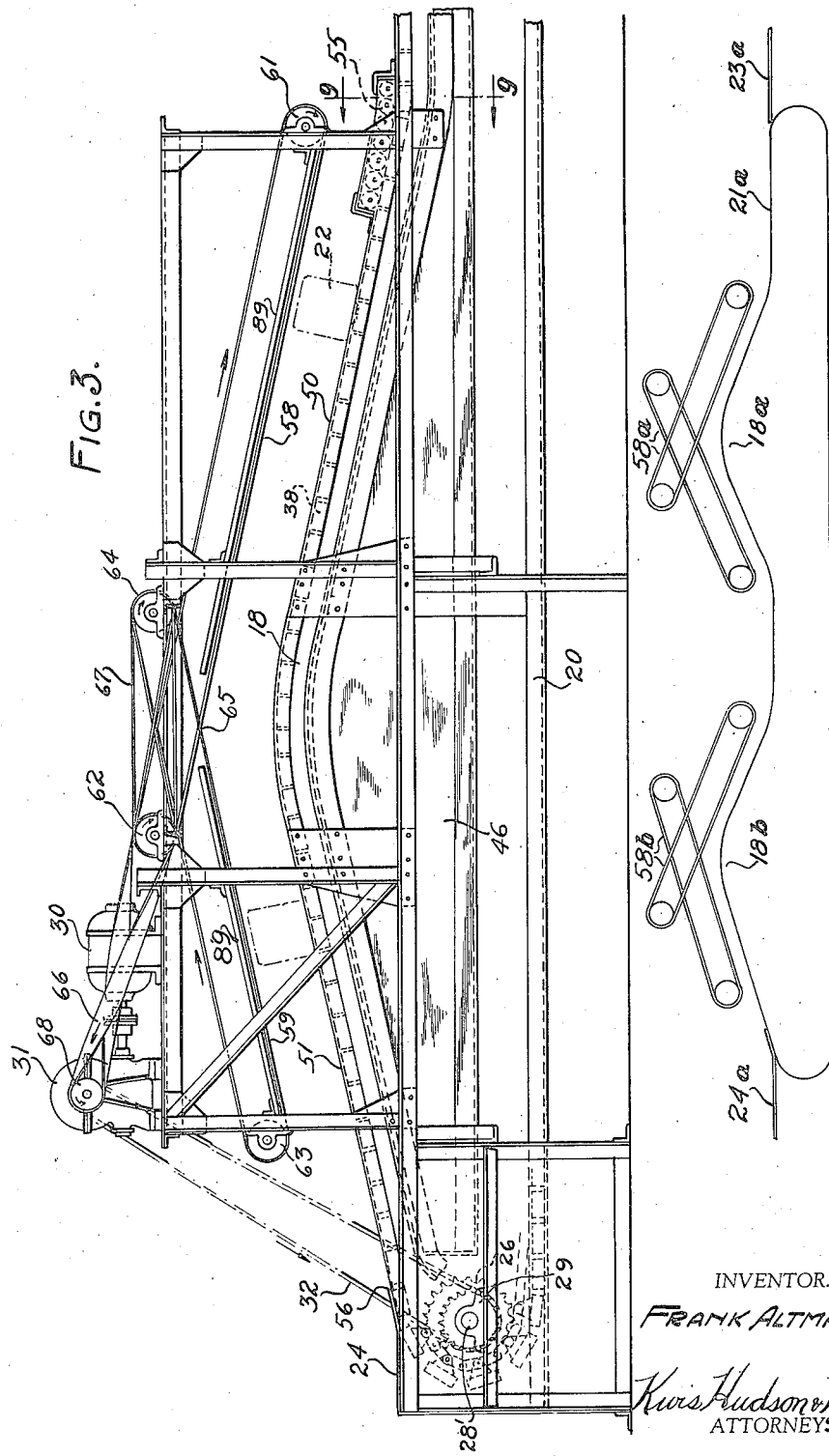

June 28, 1938. F. ALTMAYER 2,122,272
BATTERY DUMPER
Filed March 16, 1935 4 Sheets-Sheet 3
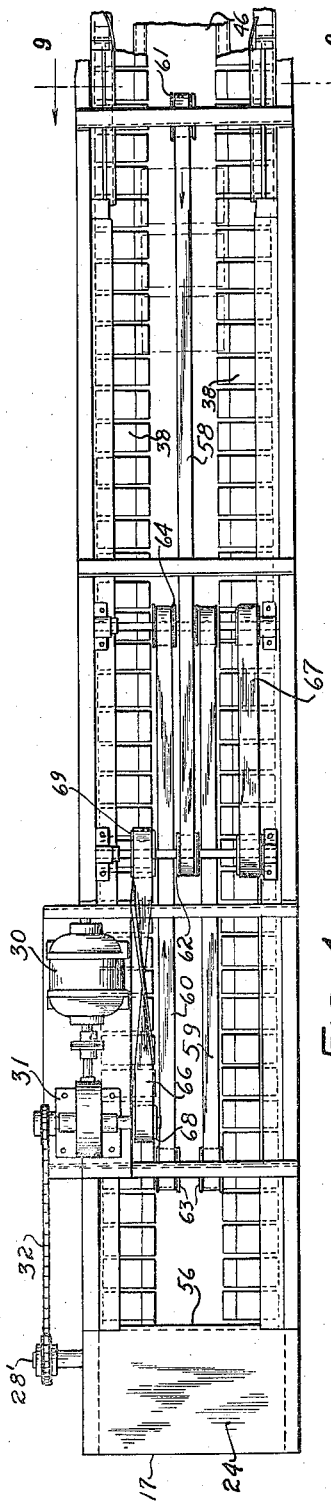
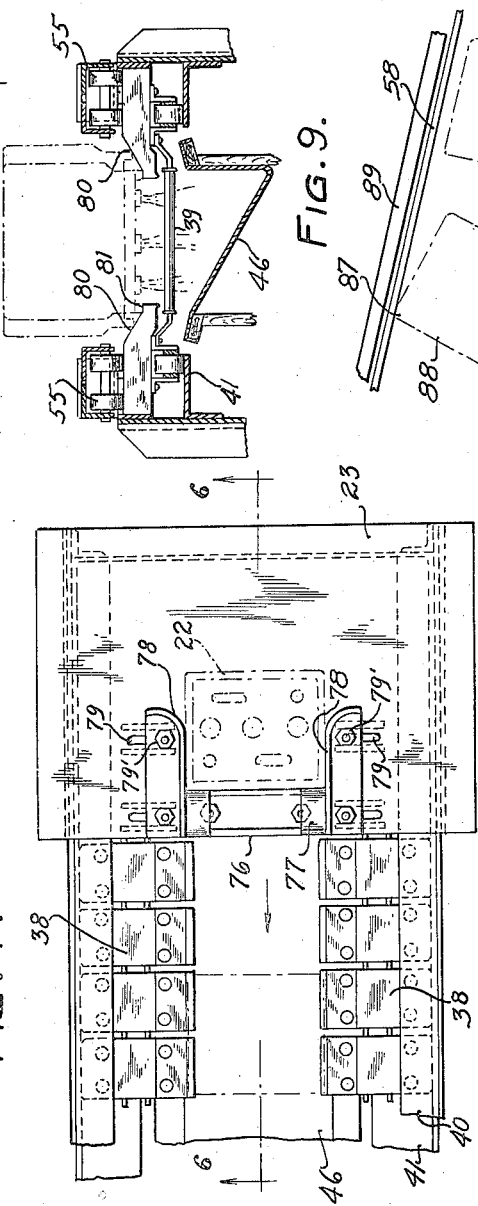
INVENTOR.
FRANK ALTMAYER
BY
Kurs Hudson & Kent
ATTORNEYS

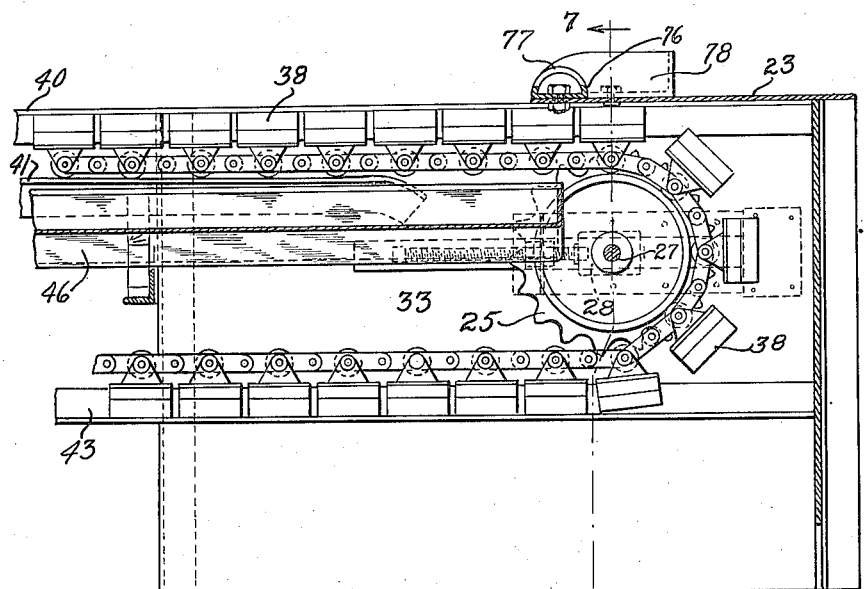
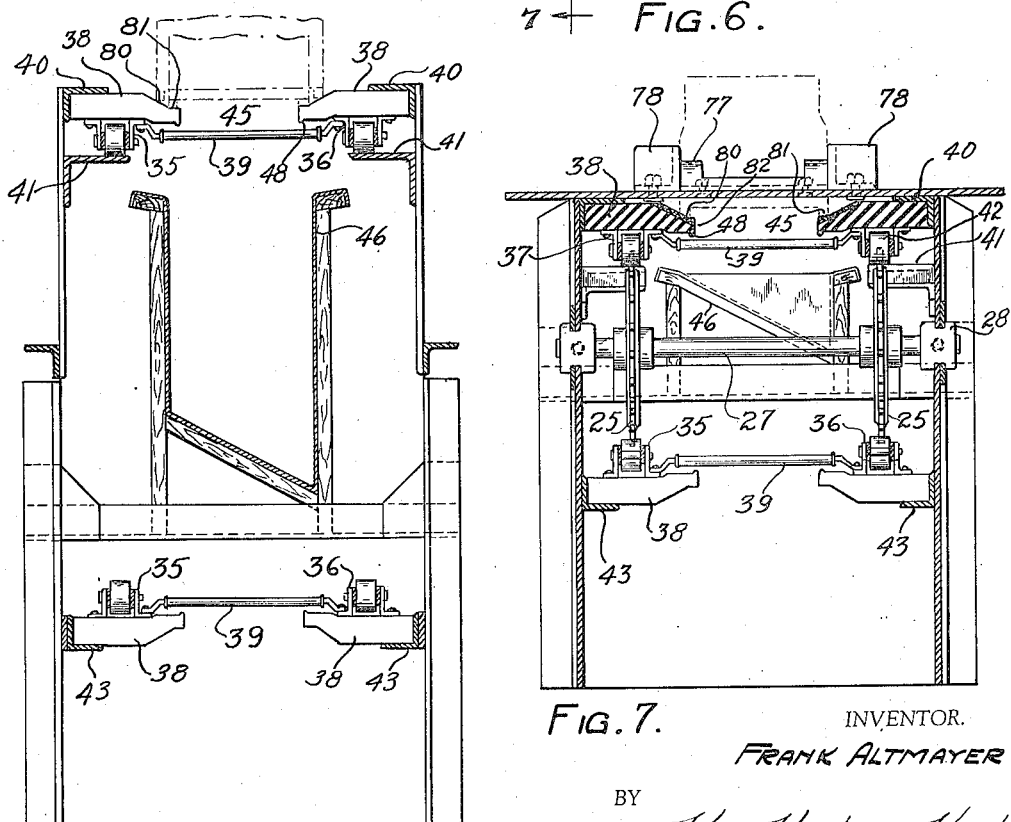

Patented June 28, 1938

2,122,272

UNITED STATES PATENT OFFICE 2,122,272

BATTERY DUMPER

Frank Altmayer, Cleveland, Ohio, assignor to Willard Storage Battery Company, Cleveland, Ohio, a corporation of West Virginia Application March 16, 1935, Serial No. 11,478

7 Claims. (Cl. 214—1.1)

This invention relates to apparatus for emptying fluid containers, and more particularly to apparatus of this kind which may be used in dumping the electrolyte from storage batteries.

In the manufacture of electric storage batteries it is usual to subject the plate groups of the batteries to successive charging operations which are sometimes referred to as an initial charge and a final or mixing charge. In carrying out these charging operations it is desirable to remove the acid or electrolyte from the batteries after the initial charge, and to refill the batteries with an electrolyte of a different specific gravity prior to the final or mixing charge. The present invention relates more specifically to apparatus which may be used in removing the electrolyte from storage batteries after the initial charging operation.

An object of the present invention is to provide apparatus for efficiently and rapidly removing electrolyte from storage batteries without damage to the batteries.

Another object of the invention is to provide improved apparatus for emptying fluid containers, such apparatus including means for supporting the containers in inverted relation and means for causing tilting of the inverted containers to facilitate the drainage of fluid therefrom.

Another object of the invention is to provide container dumping apparatus, including a conveyor and one or more humps over which inverted containers are moved to tilt the same and thus facilitate the drainage of fluid therefrom.

A further object of the invention is to provide container dumping means having a hump for causing tilting of inverted containers, and wherein means is provided to prevent toppling of the inverted containers during movement thereof over the hump.

A further object of the invention is to provide container dumping apparatus embodying a conveyor for moving inverted containers and means for inverting the containers being supplied to the conveyor.

It is also an object of this invention to provide container dumping apparatus embodying a conveyor for moving inverted containers and wherein the container supporting parts of the conveyor are such that the uppermost portions of containers of different sizes will be disposed at an elevation to cooperate with an anti-toppling means.

The invention may be further briefly summarized as consisting in certain novel combinations and arrangements of parts hereinafter described and more particularly set out in the appended claims.

In the accompanying sheets of drawings,

Fig. 1 is an elevational view showing container dumping apparatus embodying my invention.

Fig. 2 is a plan view thereof.

Fig. 3 is an elevational view showing a part of the apparatus of Fig. 1, but on a larger scale.

Fig. 4 is a plan view showing a part of the apparatus of Fig. 2, but on a larger scale.

Fig. 5 is a partial plan view showing the receiving end of the apparatus.

Fig. 6 is a partial longitudinal sectional view taken through the receiving end, as indicated by line 6—6 of Fig. 5.

Fig. 7 is a transverse sectional view taken at the receiving end of the apparatus, as indicated by line 7—7 of Fig. 6.

Fig. 8 is a transverse sectional view taken through the hump portion of the apparatus, as indicated by line 8—8 of Fig. 1.

Fig. 9 is a partial transverse sectional view showing how containers of different size are supported on the conveyor.

Fig. 10 is a partial side elevation showing containers being moved up the incline of the hump.

Fig. 11 is a side elevation, more or less diagrammatic, illustrating another belt arrangement for the anti-toppling means, and Fig. 12 is a more or less diagrammatic side elevation showing dumping apparatus of my invention having a plurality of humps.

In the accompanying drawings to which more detailed reference will now be made, I have illustrated apparatus for rapidly and efficiently emptying fluid containers and which is especially suitable for dumping electrolyte from storage batteries after the plates thereof have been subjected to the initial charging operation. While the drawings show what I now regard to be a preferred form of my dumping apparatus, it should be understood, however, that the drawings are to be regarded only as being illustrative of the invention defined in the claims.

In general, the container dumping apparatus of my invention comprises an elongated structure 15, having a receiving end 16, where fluid containers are applied to a conveyor in inverted relation, and a discharge end 17 where the emptied containers are delivered. Intermediate the loading and discharge ends the structure is provided with one or more humps 18, over which the containers are moved to cause tilting to facilitate drainage of fluid from the containers. Although the drawings show my container dumping apparatus as being used in connection with the manufacture of electric storage batteries, it will be understood, of course, that the apparatus may be used in the handling and dumping of various kinds of containers. As a matter of convenience I shall hereinafter refer to the fluid containers as storage batteries.

My improved dumping apparatus includes an elongated frame or supporting structure 20, upon which an endless conveyor 21 is arranged to move or carry inverted containers, such as the storage batteries 22, from the receiving end 16 to the discharge end 17. The supporting structure 20 may be of any suitable form and, as shown in this instance, may be constructed from suitably arranged structural members. The supporting structure and conveyor may be of any desired length, but should be long enough that with a desired conveyor speed the batteries will travel in inverted position during a period of time sufficient to insure substantially complete drainage of fluid therefrom. At its receiving end the supporting structure may have a plate providing a table-like part 23 upon which the batteries are received just prior to their being inverted and applied to the receiving end of the endless conveyor 21. The supporting structure may also have a table-like part 24 at its opposite end, to which the emptied containers are transferred from the discharge end of the conveyor and from which the batteries may be taken for refilling with electrolyte.

The conveyor 21 is preferably of the endless type and may be arranged to extend over pairs of sprocket wheels 25 and 26, which are located, respectively, adjacent the receiving and discharge ends of the apparatus. The sprocket wheels 25 may be mounted upon a transverse shaft 27, which is journaled in suitable bearings 28 provided on the supporting structure. The sprocket wheels 26 may be mounted upon a shaft 28', which is likewise journaled in suitable bearings 29, and which may be driven from an electric motor 30 through a reduction gearing 31 and a belt or chain 32. Provision may be made for adjustment of the tension of the endless conveyor by arranging the bearings 28 for movement on the supporting structure and providing adjusting screws 33 for shifting and positioning these bearings.

The endless conveyor may comprise two laterally spaced chains 35 and 36, each of which passes over one pair of the sprocket wheels 25 and 26. These chains may comprise any suitable arrangement of links which would be satisfactory for the present purpose. Each of the conveyor chains is provided at longitudinally spaced points with clips or brackets 37 to which a series of transverse supporting members or slats 38 are connected. These slats receive and support the batteries, as will be explained more fully hereinafter. The two conveyor chains 35 and 36 may be connected together by longitudinally spaced transverse cross-bars or links 39.

The supporting structure 20 is provided near the top thereof with vertically spaced structural members 40 and 41, which may be in the form of angle irons, and which form rails extending longitudinally at the sides of the structure, as shown in Figs. 7 and 8. The upper rails 40 provide guides for the outer ends of the conveyor slats 38, and the lower rails 41 provide track-like supports for the conveyor chains. If desired, the conveyor chains may be of the type having rollers 42 suitably mounted in the links and arranged to roll upon the track-like supports 41 so that the weight of the conveyor and of the batteries carried thereon will not cause scraping of the chains upon these members. The supporting structure may be provided with similar angle members 43 extending longitudinally at the sides of the structure below the sprocket wheels 25 and 26. These latter members provide rails which guide and support the return portions of the conveyor with the outer ends of the slats 38 engaging in the recesses of the angles.

It will be observed that the supporting structure 20, as shown in the drawings and as described above, has a central slot-like opening 45 extending longitudinally between the angle members at opposite sides of the structure, and beneath this opening I provide a longitudinally extending container or trough 46, into which the acid being drained from the batteries may drop as the latter are being moved along by the conveyor.

As shown in the drawings, the slats of each conveyor chain are arranged relatively close together to form a longitudinally extending series. The slats of the two series have their inner or adjacent ends spaced apart laterally so as to provide a longitudinally extending central slot or opening through the conveyor above the opening 45 of the supporting structure. Thus when the batteries are supported on the conveyor, as shown in the drawings, with their opposite ends resting on the two series of slats, the intermediate portions of the batteries will span the opening of the conveyor and the acid will drain downwardly through the conveyor opening and through the opening 45 of the frame into the trough 46. The slats 38 are preferably made long enough so that the inner ends thereof overhang the sides of the trough, as shown in Fig. 7, and may be provided at their inner ends with depending bead-like extensions 48 which cause the liquid to drip into the trough instead of traveling along the slats. Since the fluid being drained from the storage batteries is an acid, it is desirable to construct the slats 38 of acid-resistant material, such as wood or hard rubber. If desired, the bottom of the trough 46 may be sloped transversely as shown in the drawings to prevent splashing as the acid drops into the trough.

An important feature of my invention is the provision of one or more humps 18 over which the inverted batteries are moved to cause a tilting which will facilitate the drainage of fluid from the batteries. Such a hump may be constructed in various ways and, as shown in this instance, may consist of an upwardly inclined part 50 and a downwardly inclined part 51. These inclined parts may be formed as a continuation of the longitudinally extending side members or rails 40, 41 and 43 of the supporting structure. The inclined parts 50 and 51 preferably have the same inclination, the angle of which may be selected to best suit the characteristics of the articles being handled by the apparatus. In this instance I show the inclined parts 50 and 51 as having an inclination of approximately 20° with respect to the straight portion of the supporting structure 20. The top portions or runs of the conveyor chains 35 and 36 extend over the hump, as shown in Fig. 3, so that they will carry the inverted batteries over the hump and will cause the batteries to be tilted first in one direction and then in the other. Such tilting of the batteries is illustrated in Fig. 3 of the drawings and facilitates the flow of electrolyte from the battery openings.

Since the conveyor chains extend upwardly over the hump it may be desirable to provide a suitable arrangement of rollers 55 at the point of beginning of the hump to prevent binding of the conveyor chains as the direction of travel of the conveyor is changed at this point. The downwardly extending inclined part 51 of the hump is preferably arranged to extend substantially tangentially of the sprockets 26, so that the conveyor chains will pass from the hump directly to the sprockets 26 without flattening out to a horizontal condition. This is desirable because it eliminates the need for bearing rollers such as the rollers 55 on the unloading side of the hump, and is also desirable for the more important reason that the batteries approach the table part 24 at the discharge end in an inclined position and can be tipped over the bolster or abutment 56, provided by the forwardly extending portion of the table part 24, and thereby transferred from the conveyor to the table 24 without any of the acid being spilled onto the covers and other top portions of the battery, where it would dull or mar the finish.

As another feature of my invention I provide means for preventing toppling of the inverted batteries as they are moved over the hump 18 by the conveyor. This anti-toppling feature of my invention consists in providing means spaced above the inclined parts of the hump for cooperation with the uppermost portions of the inverted batteries to prevent the same from falling over on their sides. The anti-toppling feature may consist of belt means spaced above the hump and movable in the direction of travel of the conveyor. Various arrangements of belts may be provided for this purpose, one belt arrangement being shown in Figs. 3 and 4 of the drawings where a single belt 58 is disposed above the upwardly inclined part 50 of the hump and extends substantially parallel thereto. Above the downwardly inclined part of the hump, and substantially parallel thereto, I provide a pair of laterally spaced belts 59 and 60. The belt 58 extends over suitably arranged pulleys 61 and 62, and the belts 59 and 60 extend over suitably arranged pulleys 63 and 64. The upper portion of the belt 58 is arranged to extend between the upper portions of the laterally spaced belts 59 and 60, so that a point of intersection 65 for the planes of travel of the belts is provided substantially directly above the highest point of the hump 18.

The portions of the anti-toppling belts 58, 59 and 60 nearest the conveyor travel in the same direction as the conveyor and at approximately the same speed. These belts may be suitably driven from the same electric motor which drives the conveyor by means of belts 66 and 67. The belt 66 extends from a pulley 68 mounted on a shaft of the reduction gearing 31 to a pulley 69, which is mounted upon the same shaft as the pulley 62. The belt 67 extends around pulleys which are mounted, respectively, upon the same shafts which carry the pulleys 62 and 64.

If desired a different and somewhat simpler belt arrangement may be used in providing the anti-toppling feature, and I have illustrated this second belt arrangement more or less diagrammatically in Fig. 11 of the drawings. In this latter arrangement I provide a single endless belt 70 in place of the three belts 58, 59 and 60, and the connecting belt 67. The single belt 70 extends over suitably arranged pulleys 71 so that portions 72 and 73 of the belt travel above the inclined parts 50 and 51 of the hump in substantially parallel relation thereto. A bight of the belt 70 may be arranged to extend over an idler pulley 74, which may be adjustably mounted so that the tension of the belt may be varied. The belt 70 may be driven from the electric motor 30' through reduction gearing 31' and a belt 66'.

A further feature of my invention consists in the provision of means for inverting the batteries as they are applied to the receiving end of the conveyor. This inverting or tipping means may consist of a stationary abutment 76 located at the receiving end of the conveyor adjacent the inner edge of the table part 23. This abutment may be of any suitable size or shape, and preferably has laterally spaced rounded portions 77 against which a side face of the battery bears as the latter is tipped or rolled over the abutment. The tipping abutment may be conveniently formed from a section of pipe by cutting out portions thereof to provide the structure shown in the drawings.

To facilitate movement of the containers or batteries into engagement with the tipping abutment 76, I provide suitably spaced guide members 78 adjacent the ends of the abutment. These guide members are spaced apart a distance to conveniently receive therebetween the batteries which are to be supplied to the conveyor, and are arranged to extend in the direction of the conveyor so as to direct or guide the batteries into engagement with the tipping abutment as they are slid or moved on the table part 23. The guides 78 may be adjusted toward or away from each other to accommodate different length batteries by providing the table part 23 with slots 79 through which the guide clamping bolts 79' extend.

Since the storage batteries used for different purposes and in different makes of automobiles are frequently of different sizes, I have provided means whereby the dumping apparatus of my invention will accommodate storage batteries of these different sizes. To this end I construct the slats 38 of the conveyor chains 35 and 36 with tapered or beveled portions 80 at their adjacent or inner ends. The beveled surfaces of the conveyor slats are in diverging relation, as shown in Fig. 7 of the drawings, and may terminate in relatively straight extensions 81. The portions of these diverging surfaces which will be engaged by the ends or handles of the battery will be different for different lengths of containers. The angle for the bevel of the conveyor slats is so selected that even though a variety of different lengths of batteries may be applied to the conveyor, the uppermost portions of the inverted batteries will lie at substantially the same elevation. In other words, the angle of bevel for the conveyor slats is such that the longer batteries, which are ordinarily of shallower depth, will be supported at a higher point on the slats and the shorter batteries, which are ordinarily relatively deeper, will be supported at a lower point and this will result in the bottoms of the inverted batteries being disposed at approximately the same height above the top of the conveyor. This is an important feature where batteries of different sizes are to be handled by the same apparatus, because if the bottoms of the inverted batteries are not at substantially the same elevation above the top of the conveyor, the anti-toppling means will not cooperate properly to prevent toppling of the batteries as they pass over the hump. With the beveled conveyor slats above described, it will be seen that the bottoms of the inverted batteries will always be at approximately the same elevation above the top of the conveyor, and hence all of the batteries will be able to pass beneath the belts of the anti-topping means and with the bottoms of the inverted batteries sufficiently close to the belts to enable the latter to prevent the batteries from toppling or falling over on their side.

The containers of the storage batteries may be formed of hard rubber, or other more or less brittle material, and it may therefore be desirable to provide the conveyor slats 38 with resilient covering to prevent damage to the containers. Such resilient covering may be provided on the beveled portions of the conveyor slats, as shown in Fig. 7, where it is engaged by the ends of the batteries as they are applied to the conveyor. This resilient covering may comprise a layer 82 of any suitable material, such as a layer of soft rubber which may be cemented or otherwise attached to the slat.

In the operation of my improved dumping apparatus, batteries 22 which are to be emptied may be delivered to the table part 23 at the receiving end of the apparatus by a transverse conveyor 84. The batteries arrive on the conveyor 84 in normally upright relation, and an operator stationed at this point slides the batteries in succession from this conveyor and across the table part 23 into the space between the guides 78. These guides align the batteries with the slot 45 of the supporting structure and with the beveled supporting portions of the conveyor slats 38. As the operator moves the battery in the direction of travel of the conveyor, the guides 78 direct the battery into engagement with the tipping abutment or bolster 76. Further movement of the battery causes the same to be tipped or rolled over the abutment and thereby deposited in inverted relation upon the beveled portions of the conveyor slats 38. As indicated in broken lines in Figs. 7 and 9, the battery then is supported upon the slats 38 with its length extending transversely of the conveyor and with the openings of the battery disposed above the longitudinal space between the conveyor slats and the slot 45 of the supporting structure. In this position the battery openings are disposed directly above the trough 46, so that the electrolyte which drains from the battery openings will flow into the trough where it will be collected for further disposition.

As the conveyor chains are driven by the sprockets 26, the inverted batteries, which have been placed upon the slats 38 in succession, are moved along in a series from the table part 23 toward the hump 18, as indicated in Figs. 1 and 2. As the batteries are moved up the incline 50 of the hump they are tilted out of the vertical plane causing the electrolyte to run from one side of the battery cell covers toward the other, which results in much of the electrolyte being discharged through the cover openings. As the batteries are moved over the high point of the hump by the conveyor and start down the oppositely inclined part 51, they are tilted in the opposite direction, which causes electrolyte to run from the opposite side of the cell covers toward the openings thereof and results in substantially all of the remaining electrolyte being discharged from the battery.

During movement of the batteries up the inclined part 50 and down the inclined part 51 they ordinarily occupy the position shown in dotted lines in Figs. 1 and 3 and as represented by the outline 85 in Fig 10. In instances where the batteries are of the type having containers with stub handles 86 at the ends thereof, the inverted batteries are supported upon these stub handles and there is sometimes a tendency for a battery to topple over on its side from the inclined inverted position represented by the outline 85. When this occurs the anti-toppling belts 58, 59 and 60 are engaged by a bottom edge or corner 87 of the battery container, as represented by the outline 88 of Fig. 10, and the battery is thereby held against falling over upon its side. Deflection of the anti-toppling belts when engaged by a bottom corner 87 of a battery may be prevented by providing suitable backing strips 89 above the lower portions of the belts.

As the emptied batteries move down the incline 51 of the hump they approach the table part 24 at the discharge end of the apparatus. At this point a second operator tips the batteries in succession over the abutment or bolster 56, thereby removing the same from the conveyor and at the same time reinverting and depositing them upon the table part 24 in their normally upright position. The emptied batteries may then be removed from the table part to make room for succeeding batteries arriving on the conveyor. Removal of the batteries from the table part 24 may be facilitated by providing a transverse conveyor 90 onto which the batteries may be slid by the operator.

While the dumping apparatus of my invention may be constructed with a single hump, it may also be constructed with a plurality of humps, as shown in Fig. 12, over which the batteries are moved in succession. In Fig. 12 I have represented the conveyor 21a as extending over humps 18a and 18b which are provided, respectively, with anti-toppling belts 58a and 58b. The batteries may be loaded onto the conveyor from a table 23a, and at the opposite end of the apparatus, may be transferred to a delivery table 24a. During their travel, the batteries pass over the humps 18a and 18b in succession and in passing over each hump each battery is tilted first in one direction and then the other to facilitate the drainage of acid therefrom.

From the foregoing description and the accompanying drawings it will now be readily seen that I have provided novel apparatus for rapidly and efficiently emptying storage batteries or other containers without damaging or marring the same. It will be understood further, that I obtain an efficient dumping action by providing one or more humps over which the containers are moved in inverted position, and which cause tilting of the inverted containers to facilitate drainage of fluid therefrom.

While I have illustrated and described the dumping apparatus of my invention in a somewhat detailed manner, it will be understood, of course, that I do not wish to be limited to the precise details and arrangements illustrated and described, but regard my invention as including such changes and modifications as do not involve a departure from the spirit of the invention and the scope of the appended claims.

Having thus described my invention, I claim:

1. In apparatus for emptying storage batteries of the electrode-electrolyte type the combination of a traveling conveyor adapted to receive filled batteries at one end thereof and to advance the same and deliver emptied batteries at its other end, means for inverting the batteries being supplied to the receiving end of the conveyor comprising a substantially semi-cylindrical abutment member contiguous to the receiving end and disposed with its axis transverse to the axis of the conveyor, and a substantially flat table at the receiving end for supporting the batteries in a normal upright position and across which the batteries may be manually slid during feeding thereof to said abutment and conveyor.

2. In apparatus for emptying storage batteries of the electrode-electrolyte type the combination of a traveling conveyor adapted to receive filled batteries at one end thereof and to advance the same and deliver emptied batteries at its other end, means for inverting the batteries being supplied to the receiving end of the conveyor comprising a substantially semi-cylindrical abutment member contiguous to the receiving end and disposed with its axis transverse to the axis of the conveyor, and a substantially flat table at the receiving end for supporting the batteries in a normal upright position and across which the batteries may be manually slid during feeding thereof to said abutment and conveyor, said abutment having spaced rounded portions with which corresponding spaced portions of the battery have rolling contact while being inverted.

3. In apparatus of the character described the combination of an elongated support having upwardly and downwardly inclined portions intermediate its ends, an endless conveyor operable to move inverted containers along said support and over said inclined portions, and means spaced above said inclined portions and movable in the direction of the conveyor to prevent toppling of the inverted containers.

4. In combination, an elongated conveyor support having a hump intermediate its ends, a conveyor for moving inverted containers along said support and over the hump thereof, and belt means spaced above the hump for cooperation with bottom portions of the containers.

5. In combination a support having article receiving and discharge ends, and a hump therebetween, a conveyor for moving articles along the support and over said hump, and means spaced above the hump to prevent toppling of the articles moving thereover, said conveyor having article engaging portions such that the uppermost portions of the articles of different sizes are at approximately the same height above the conveyor to cooperate with said spaced means.

6. A battery dumping apparatus comprising in combination a supporting structure providing a hump, a conveyor for moving batteries in inverted position over said hump, and a belt spaced above the hump and movable in the direction of the conveyor for cooperation with the bottoms of the batteries to prevent toppling thereof, said conveyor having battery supporting members thereon shaped to cause the bottoms of different sized batteries to be disposed above the conveyor at a height for cooperation with said belt.

7. In a container dumping apparatus the combination of a support having a longitudinally extending opening, and a conveyor on said support having a series of container supporting slats movable along each side of said opening and extending transversely to the direction of conveyor movement, the adjacent ends of said slats being of tapering thickness such that different portions of the slats will be engaged by containers of different size.

FRANK ALTMAYER.